(12) United States Patent
Ito et al.

(10) Patent No.: US 9,362,820 B2
(45) Date of Patent: Jun. 7, 2016

(54) DCDC CONVERTER, SEMICONDUCTOR DEVICE, AND POWER GENERATION DEVICE

(75) Inventors: Yoshiaki Ito, Tokyo (JP); Kei Takahashi, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 835 days.

(21) Appl. No.: 13/239,515

(22) Filed: Sep. 22, 2011

(65) Prior Publication Data

US 2012/0086422 A1   Apr. 12, 2012

(30) Foreign Application Priority Data

Oct. 7, 2010   (JP) .................. 2010-227313

(51) Int. Cl.
*G05F 1/00* (2006.01)
*H02M 3/156* (2006.01)

(52) U.S. Cl.
CPC ..................... *H02M 3/156* (2013.01)

(58) Field of Classification Search
CPC ............. G05F 1/461; G05F 3/16; G05F 1/44; G05F 1/462; G05F 1/565; G05F 1/575
USPC .......... 323/222, 225, 268, 271, 282, 284, 285
See application file for complete search history.

(56) References Cited

U.S. PATENT DOCUMENTS

| | | | |
|---|---|---|---|
| 6,429,621 B1 | 8/2002 | Arai | |
| 7,053,649 B1 | 5/2006 | Osada | |
| 7,248,030 B2 * | 7/2007 | Yoshino | ........................ 323/284 |
| 7,486,055 B2 | 2/2009 | Yamashita | |
| 7,723,965 B2 | 5/2010 | Lesso et al. | |
| 7,994,763 B2 | 8/2011 | Lesso et al. | |
| 8,026,813 B2 | 9/2011 | Saito et al. | |
| 8,102,166 B2 | 1/2012 | Iino | |

(Continued)

FOREIGN PATENT DOCUMENTS

| | | |
|---|---|---|
| EP | 1742340 A | 1/2007 |
| EP | 1895648 A | 3/2008 |

(Continued)

OTHER PUBLICATIONS

Taiwanese Office Action (Application No. 100135013) Dated Sep. 2, 2015.

*Primary Examiner* — Matthew Nguyen
(74) *Attorney, Agent, or Firm* — Fish & Richardson P.C.

(57) ABSTRACT

A DCDC converter includes a control circuit, a transistor in which switching is controlled by being supplied voltage output from the control circuit to a gate electrode of the transistor, a voltage conversion portion in which supply of input voltage is controlled by the switching of the transistor and output power commensurate with duty ratio of the switching of the transistor, and a detection circuit detecting the output power. Further, the control circuit includes a control signal generation circuit generating a control signal with a pulse voltage waveform and a selection circuit applying voltage of the control signal to the gate electrode in the case where current detected by the detection circuit is the same as or exceeds the threshold value and applying voltage for turning on the transistor to the gate electrode in the case where the current detected by the detection circuit falls below the threshold value.

10 Claims, 11 Drawing Sheets

(56) References Cited

U.S. PATENT DOCUMENTS

| | | |
|---|---|---|
| 8,123,137 B2 | 2/2012 | Matsumoto et al. |
| 8,159,200 B2 | 4/2012 | Lesso et al. |
| 8,224,277 B2 | 7/2012 | Furutani |
| 8,248,046 B2 | 8/2012 | Hasegawa |
| 8,310,219 B2 | 11/2012 | Kuroyabu et al. |
| 8,618,462 B2 | 12/2013 | Kimura et al. |
| 8,686,696 B2 | 4/2014 | Watanabe |
| 8,704,504 B2 | 4/2014 | Ito |
| 8,710,762 B2 | 4/2014 | Takahashi et al. |
| 8,766,608 B2 | 7/2014 | Yamazaki et al. |
| 8,816,662 B2 | 8/2014 | Takahashi et al. |
| 8,816,722 B2 | 8/2014 | Nishijima |
| 2003/0214467 A1 | 11/2003 | Koyama et al. |
| 2007/0001941 A1 | 1/2007 | Umezaki et al. |
| 2009/0224745 A1* | 9/2009 | Yamada ................ 323/311 |
| 2010/0102788 A1* | 4/2010 | Kuroyabu .......... H02M 3/156 323/282 |
| 2010/0213874 A1* | 8/2010 | Lee ................ H04L 25/26 315/302 |
| 2011/0089927 A1 | 4/2011 | Yamazaki et al. |
| 2011/0133706 A1 | 6/2011 | Takahashi et al. |
| 2011/0175861 A1 | 7/2011 | Wakimoto et al. |
| 2011/0241435 A1 | 10/2011 | Saito |
| 2011/0254523 A1* | 10/2011 | Ito et al. ................ 323/282 |
| 2011/0261043 A1 | 10/2011 | Hayakawa et al. |
| 2011/0273021 A1 | 11/2011 | Kimura et al. |
| 2011/0285426 A1 | 11/2011 | Takahashi et al. |
| 2012/0019222 A1 | 1/2012 | Kimura et al. |
| 2012/0043953 A1 | 2/2012 | Ohmaru |
| 2012/0081089 A1 | 4/2012 | Ohmaru |

FOREIGN PATENT DOCUMENTS

| | | |
|---|---|---|
| EP | 2182624 A | 5/2010 |
| JP | 2002-199614 A | 7/2002 |
| JP | 2006-149067 A | 6/2006 |
| JP | 2008-236822 A | 10/2008 |
| JP | 2010-088278 A | 4/2010 |
| JP | 2010-110070 A | 5/2010 |
| JP | 2010-183822 A | 8/2010 |
| TW | 200601676 | 1/2006 |
| TW | 200818681 | 4/2008 |

* cited by examiner

DCDC CONVERTER, SEMICONDUCTOR DEVICE, AND POWER GENERATION DEVICE

BACKGROUND OF THE INVENTION

1. Field of the Invention

The present invention relates to a DCDC converter, and a semiconductor device and a power generation device including a DCDC converter.

2. Description of the Related Art

A DCDC converter is a constant-voltage circuit with which a constant output voltage can be obtained regardless of the value of input voltage, and the DCDC converter is used for a power supply circuit together with a rectification circuit or the like. In particular, a power supply circuit including a switching-type DCDC converter is referred to as a switching power source or a switching regulator.

The switching-type DCDC converter outputs voltage of a desired level in such a manner that voltage with a pulse waveform is formed using input voltage by a switching element and the voltage is smoothed or held in a coil, a capacitor, or the like. With a switching-type DCDC converter, internal power loss can be small theorically, whereby power conversion efficiency can be high and heat radiation due to power loss can be suppressed in comparison with a linear-type DCDC converter utilizing voltage drop due to resistance.

In Patent Document 1 below, a solar power storage device is disclosed in which voltage generated by a solar cell is converted to charging voltage in accordance with a driving clock by a voltage conversion circuit and a duty ratio of the driving clock is determined in accordance with the maximum charging power which is determined by the above generated voltage. In addition, in Patent Document 2 below, a power supply control device is disclosed in which a voltage difference between a source and a drain of a FET serving as a switching element is monitored and the FET is turned on when the voltage difference exceeds a threshold value, so that it is capable of dealing with a sudden increase of the amount of power consumption in a load.

REFERENCE

[Patent Document 1] Japanese Published Patent Application No. 2002-199614
[Patent Document 2] Japanese Published Patent Application No. 2010-183822

SUMMARY OF THE INVENTION

However, although the switching-type DCDC converter has higher power conversion efficiency than the linear-type one, it is necessary to further increase power conversion efficiency in order to achieve a reduction in power consumption of a semiconductor device including the DCDC converter. In particular, in the case of a portable electronic device using power accumulated in a capacitor or a battery such as a primary battery or a secondary battery, the DCDC converter is necessarily used for converting voltage output from the battery, the capacitor, or the like into voltage of an optimal level. Improvement of power conversion efficiency of the DCDC converter leads to lower power consumption of a semiconductor device and a long continuous operating time of a portable electronic device including the semiconductor device.

In the case of a power generation device which is powered utilizing natural energy, such as solar power generation or wind power generation, the power is often supplied to a power storage portion or a load of a secondary battery, a capacitor, or the like after the power is converted into a constant voltage by a DCDC converter. For example, in the case of a power generation device in which a lithium ion battery is charged with the use of power obtained by solar power generation, the power outputted from a solar battery is converted into a constant voltage by a step-down DCDC converter and then is supplied to the lithium ion battery.

However, in the case of the power generation device described above, the amount of obtained power often depends on natural conditions. Thus, in the case where the amount of obtained electric power is small in a power generation portion of a solar battery, for example, the amount of power inputted to a DCDC converter is also small. Further, in a switching-type DCDC converter, in the case where the amount of input power is large, power conversion efficiency is kept high; however, in the case where the amount of input power is small, power conversion efficiency is low. Accordingly, in the case where the amount of power obtained in a power generation portion is small, the amount of power supplied from a DCDC converter to a secondary battery or a load is also small. As a result, a problem such that charge in a power storage portion is not performed or operation in a load is not normally performed is often caused.

In view of the above problems, an object of the present invention is to provide a DCDC converter with which power conversion efficiency is improved. Further, an object of the present invention is to reduce power consumption of a semiconductor device including a DCDC converter. Further, an object of the present invention is to provide a power generation device achieving improvement of power conversion efficiency.

One of the factors of lowering power conversion efficiency of the DCDC converter when input power is small is that switching of a switching element for controlling the value of output voltage is performed even when the input power is small. This is because when the switching of a switching element is performed, power is consumed in the charging and discharging in the switching element, and in addition, power is consumed also in the control circuit for controlling the switching.

In view of the above, the step-down DCDC converter of one embodiment of the present invention detects output voltage or output current. When the output voltage or the output current gets small and falls below the threshold value, the control circuit stops generating a control signal with a pulse waveform for switching the switching element and outputs voltage for holding the switching element in ON state. By stopping the generation of a control signal in the control circuit, power consumption in the control circuit can be reduced. In addition, by holding the switching element in ON state, power consumption in the switching element can be reduced.

Note that in a step-down DCDC converter, difference between input voltage and output voltage is small when input power is low. Therefore, even when the switching element is held in ON state and the input voltage is output as output voltage without being stepped down and with no change, it would be little problem for operation of a semiconductor device and a power generation device using a DCDC converter.

Further, in one embodiment of the present invention, in the step-down DCDC converter, when the switching element is in ON state, one of a source terminal and a drain terminal of an insulated gate transistor serving as a switching element, to which input voltage is supplied is connected to a gate electrode thereof; or one of the terminals and the gate electrode are supplied with voltage of the same level. Since the transistor serves as a diode with the structure, even when a backflow prevention diode is not additionally provided, current can be prevented from flowing backward from the output side to the input side of the DCDC converter when input voltage falls below output voltage.

Specifically, a DCDC converter according to one embodiment of the present invention includes a control circuit, a transistor in which switching is controlled by supply of voltage output from the control circuit to a gate electrode of the transistor, a voltage conversion portion in which a supply of input voltage is controlled by the switching of the transistor and output power commensurate with a duty ratio of the switching of the transistor is generated, and a detection circuit detecting the output power. Further, the control circuit includes a control signal generation circuit generating a control signal with a pulse voltage waveform and a selection circuit applying voltage of the control signal to the gate electrode in the case where the output power detected by the detection circuit is the same as or exceeds a threshold value and applying voltage for turning on the transistor to the gate electrode in the case where the output power detected by the detection circuit falls below the threshold value.

In one embodiment of the present invention, generation of a control signal in a control circuit is stopped when input power is small, so that power consumption of the control circuit can be reduced. Thus, power loss inside the DCDC converter can be reduced even when input power is small, so that a reduction in power conversion efficiency can be suppressed. In addition, in one embodiment of the present invention, a reduction in power consumption of a semiconductor device including the DCDC converter can be achieved. In addition, in one embodiment of the present invention, improvement of power conversion efficiency of a power generation device including the DCDC converter can be achieved.

DETAILED DESCRIPTION OF THE INVENTION

Hereinafter, embodiments of the present invention will be described in detail with reference to the accompanying drawings. However, the present invention is not limited to the following description and it is easily understood by those skilled in the art that the mode and details can be variously changed without departing from the scope and spirit of the present invention. Accordingly, the invention should not be construed as being limited to the description of the embodiments below.

Note that the present invention includes, in its category, all the semiconductor devices in which a DCDC converter can be used: for example, integrated circuits, such as microprocessors and image processing circuits, RF tags, memory media, lighting devices including light-emitting elements, and semiconductor display devices. Further, the semiconductor display devices include semiconductor display devices including the DCDC converter, such as liquid crystal display devices, lighting devices in which a light-emitting element typified by an organic light-emitting element (OLED) is provided, electronic paper, digital micromirror devices (DMD), plasma display panels (PDP), field emission displays (FED), and the like, in its category.

In addition, the power generation device according to one embodiment of the present invention includes at least a power generation portion generating power utilizing energy other than electric energy and a DCDC converter using the energy from the power generation portion as input power. The power generation device according to one embodiment of the present invention may further include a power storage portion in which charging is performed using output power from the DCDC converter.

Embodiment 1

Figure 1:
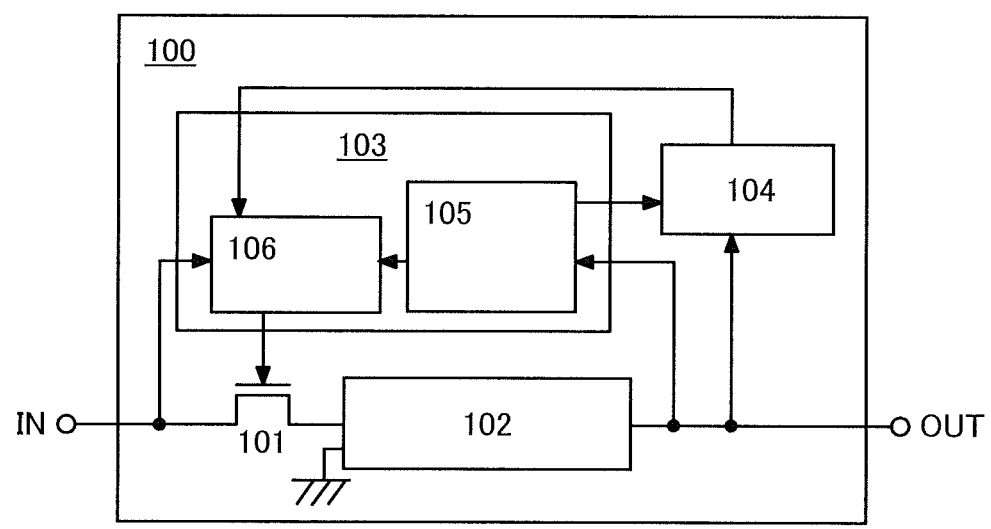
FIG. 1 is a diagram showing a structure of a DCDC converter.

FIG. 1 shows an example of a structure of a DCDC converter according to one embodiment of the present invention. A DCDC converter 100 shown in FIG. 1 includes a transistor 101 serving as a switching element, a voltage conversion portion 102, a control circuit 103, and a detection circuit 104.

The transistor 101 controls supply of voltage supplied to an input terminal IN (input voltage) to the voltage conversion portion 102. Specifically, when the transistor 101 is turned on, the input voltage is supplied to the voltage conversion portion 102, and when the transistor 101 is turned off, the supply is stopped. In addition, when the transistor 101 is turned off, fixed voltage such as ground potential is supplied to the voltage conversion portion 102. Thus, in response to switching of the transistor 101, a signal with a pulse voltage waveform in which the input voltage and the fixed voltage appear alternately is supplied to the voltage conversion portion 102.

The voltage conversion portion 102 includes at least each one of a coil, a capacitor, and a diode. The voltage conversion portion 102 generates output power with a constant-output voltage by smoothing or holding voltage of a signal when the pulsed signal is supplied.

The control circuit 103 includes a control signal generation circuit 105 and a selection circuit 106. The control signal generation circuit 105 generates a control signal with a pulse voltage waveform and supplies the signal to the selection circuit 106. The selection circuit 106 selects either the voltage of the control signal or the input voltage supplied to the input terminal IN and applies the selected voltage to a gate electrode of the transistor 101.

The selection circuit 106 selects a voltage depending on the value of the output power detected in the detection circuit 104. Specifically, the detection circuit 104 detects the output voltage or the output current of the voltage conversion portion 102. In the case where the detected output voltage or the detected output current is the same as or exceeds a threshold value, the selection circuit 106 selects the voltage of the control signal and applies the voltage to the gate electrode of the transistor 101. In the case where the detected output voltage or the detected output current falls below the threshold value, the selection circuit 106 selects the input voltage applied to the input terminal IN and applies the voltage to the gate electrode of the transistor 101.

The operation of the transistor 101 is controlled in accordance with the voltage Vgs between the gate electrode and a source terminal. Thus, in the case where input voltage is supplied to the gate electrode of the transistor 101, the transistor 101 is held in ON state. Further, in the case where the voltage of the control signal is supplied to the gate electrode, the voltage Vgs between the gate electrode and the source terminal changes in accordance with the pulse voltage waveform of the control signal and thus the transistor 101 performs switching by repeating ON and OFF. The duty ratio in the switching, which is the ratio of ON time to OFF time, depends on the voltage of the control signal.

Note that the transistor 101 controls supply of input voltage to the voltage conversion portion 102, as described above. For that reason, when the duty ratio in the switching changes, the duty ratio of the signal having a pulse voltage waveform supplied to the voltage conversion portion 102 also changes, as a result, the value of the output voltage output from the voltage conversion portion 102 changes. Specifically, the signal supplied to the voltage conversion portion 102 is a signal with a pulse voltage waveform in which input voltage and fixed voltage appear alternately. In the signal, an increase in percentage of periods in which pulses of the input voltage are generated leads to an increase in difference between the output voltage and the fixed voltage. In contrast, in the signal, a decrease in percentage of periods in which pulses of the input voltage are generated leads to a decrease in difference between the output voltage and the fixed voltage. That is, the amount of the output voltage of the voltage conversion portion 102 is commensurate with the duty ratio of the switching of the transistor 101.

Figure 2:
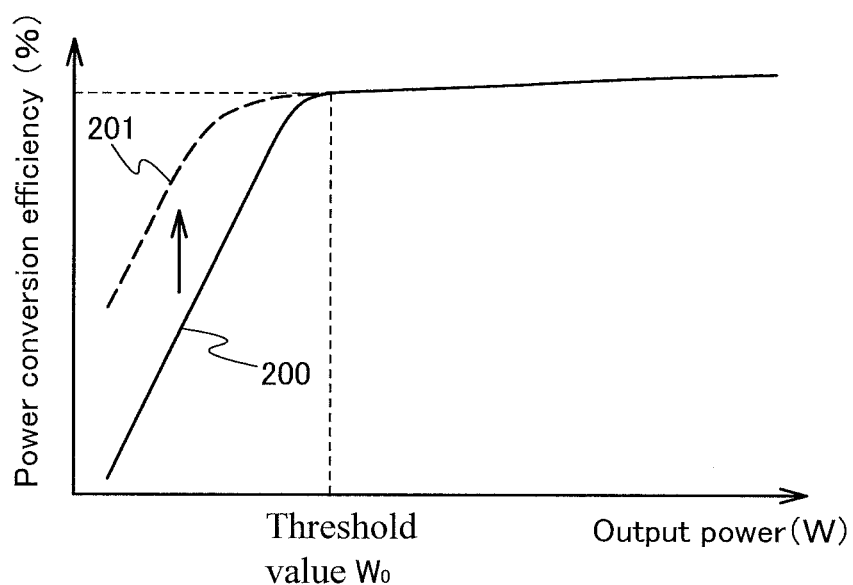
FIG. 2 is a diagram showing a relation between output power and power conversion efficiency.

In addition, the threshold value of the output voltage or the output current is preferably set to the value of the output voltage or the output current at which the power conversion efficiency begins to decline rapidly. The relation between the output power (W) of the DCDC converter 100 and the power conversion efficiency (%) is schematically shown in FIG. 2. In FIG. 2, the horizontal axis represents the output power (W) on a logarithmic scale and the vertical axis represents the power conversion efficiency (%) on a linear scale. The power conversion efficiency corresponds to the ratio of the output power (W) with respect to the input power (W).

In FIG. 2, a graph 200 shown by a solid line shows a relation between output power (W) and power conversion efficiency (%) in the case where the operation of the transistor 101 is controlled with the control signal with a pulse voltage waveform regardless of the amount of output power. A graph 201 shown by a dashed line shows a relation between output power (W) and power conversion efficiency (%) in the case where the operation of the transistor 101 is controlled with the control signal with a pulse voltage waveform when the amount of the output power is the same as or larger than the threshold value $W_0$ and where the transistor 101 is held in ON state when the amount of the output power is smaller than the threshold value $W_0$.

Power consumption in the transistor 101 and in the control circuit in the case of the graph 201 shown by the dashed line can be lower than that in the case of the graph 200 shown by the solid line. Therefore, the power conversion efficiency of the graph 201 when the amount of output power is smaller than or equal to the threshold value $W_0$ is higher than the power conversion efficiency of the graph 200, as shown by the arrow in FIG. 2.

Note that among output power output from the voltage conversion portion 102, the detection circuit 104 may detect output power, output current, or both of them.

Figure 3:
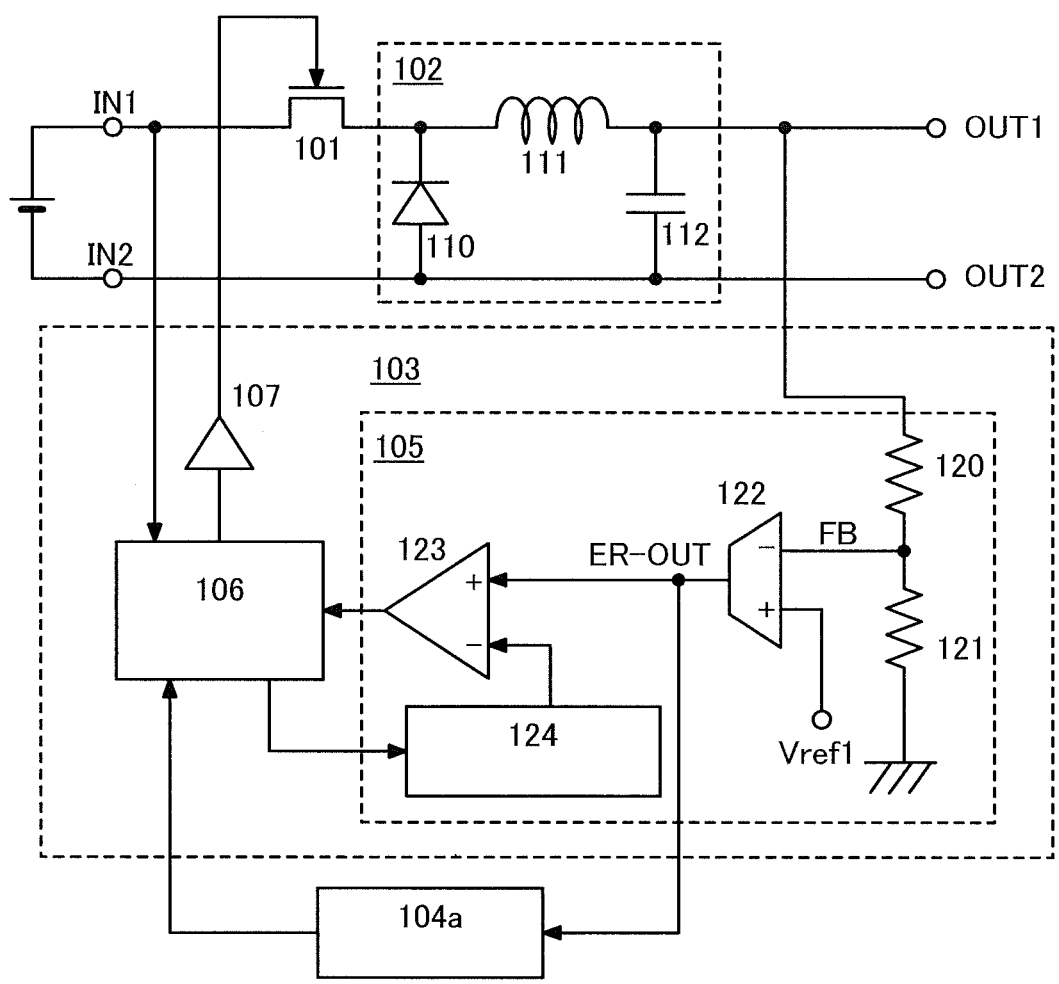
FIG. 3 is a diagram showing a structure of a DCDC converter.

FIG. 3 shows an example of a specific structure of the DCDC converter 100 in the case where a voltage detection circuit detecting the output voltage is used as the detection circuit 104.

Note that the term "connection" in this specification refers to electrical connection and corresponds to the state in which current, potential, or voltage can be supplied or transmitted. Accordingly, a connection state means not only a state of a direct connection but also a state of indirect connection through a circuit element such as a wiring, a resistor, a diode, or a transistor so that current, potential, or voltage can be supplied or transmitted.

In addition, even when different components are connected to each other in a circuit diagram, there is actually a case where one conductive film has functions of a plurality of components such as a case where part of a wiring serves as an electrode. The term "connection" in this specification also means such a case where one conductive film has functions of a plurality of components.

The terms "source terminal" and "drain terminal" of a transistor interchange with each other depending on the polarity of the transistor or a difference between levels of potentials applied to the electrodes. In general, in an n-channel transistor, a terminal to which a low potential is applied is called a source terminal, and a terminal to which a high potential is applied is called a drain terminal. Further, in a p-channel transistor, a terminal to which a low potential is applied is called a drain terminal, and a terminal to which a high potential is applied is called a source terminal. Hereinafter, one of a source terminal and a drain terminal is a first terminal and the other is a second terminal. A structure of the DCDC converter will be described below.

In addition, a "source terminal" of a transistor means a source region that is a part of an active layer or a source electrode connected to an active layer. Similarly, "drain terminal" of a transistor means a drain region that is a part of an active layer or a drain electrode connected to an active layer.

The DCDC converter according to one embodiment of the present invention is a step-down converter generating output voltage lower than input voltage. The DCDC converter shown in FIG. 3 includes the transistor 101, the voltage conversion portion 102, the control circuit 103, and a voltage detection circuit 104a.

Further, the DCDC converter shown in FIG. 3 includes an input terminal IN1 supplied with the input voltage, an input terminal IN2 supplied with a fixed voltage, an output terminal OUT1, and an output terminal OUT2.

The voltage conversion portion 102 in FIG. 3 includes a diode 110, a coil 111, and a capacitor 112. The transistor 101 controls connection between the input terminal IN1 and a cathode of the diode 110. Specifically, a first terminal of the transistor 101 is connected to the input terminal IN1 and a second terminal of the transistor 101 is connected to the cathode of the diode 110. One of terminals of the coil 111 is connected to the cathode of the diode 110 and the other of the terminals of the coil 111 is connected to the output terminal OUT1 of the DCDC converter. The input terminal IN2 is connected to an anode of the diode 110 and the output terminal OUT2. One of electrodes of the capacitor 112 is connected to the output terminal OUT1 and the other of the electrodes of the capacitor 112 is connected to the output terminal OUT2.

In the DCDC converter in FIG. 3, when the transistor 101 is turned on, a potential difference between the input terminal IN1 and the output terminal OUT1 is generated; thus, current flows through the coil 111. The coil 111 is magnetized by the current flow, and electromotive force in a direction opposite to that of the current flow is generated by self induction. Therefore, voltage which is obtained by decrease in the input voltage supplied to the input terminal IN1 is supplied to the output terminal OUT1. In other words, between the pair of electrodes of the capacitor 112, voltage corresponding to a difference between fixed voltage supplied from the input terminal IN2 and the voltage obtained by the decrease in the input voltage is applied.

When the transistor 101 is turned off, a current path formed between the input terminal IN1 and the output terminal OUT1 is blocked. In the coil 111, the electromotive force in the direction preventing the change of the current, that is, in the direction opposite to that of electromotive force generated when the transistor 101 is on is generated. Therefore, the current that flows to the coil 111 is kept by voltage generated by the electromotive force. In other words, when the transistor 101 is OFF, a current path is formed between the output terminal OUT1 and the input terminal IN2 or the output terminal OUT2 through the coil 111 and/or the diode 110. Accordingly, voltage applied between the pair of electrodes of the capacitor 112 is held to some extent.

Note that voltage held in the capacitor 112 corresponds to voltage output from the output terminal OUT1. In the above operation, as a percentage of ON time of the transistor 101 becomes higher, the voltage held in the capacitor 112 becomes closer to a difference between the fixed voltage and the input voltage. Accordingly, the voltage can be stepped down so that the output voltage close to that of the input voltage is obtained. In contrast, as a percentage of OFF time of the transistor 101 becomes higher, a difference between the fixed voltage and the voltage held in the capacitor 112 becomes smaller. Accordingly, the voltage can be stepped down so that output voltage whose level is closer to the level of the fixed voltage is obtained.

The ratio between ON time and OFF time of the transistor 101 is controlled by the control circuit 103. The control circuit 103 shown in FIG. 3 includes the control signal generation circuit 105, the selection circuit 106, and a buffer 107. Further, the control signal generation circuit 105 shown in FIG. 3 includes a resistor 120, a resistor 121, an error amplifier 122, a comparator 123, and a triangle wave generator 124.

In the control signal generation circuit 105, the resistor 120 and the resistor 121 are connected in series. One of terminals of the resistor 120 is supplied with the output voltage from the output terminal OUT1 of the DCDC converter. One of terminals of the resistor 121 is supplied with a fixed potential, such as a ground potential. A node in which the other of the terminals of the resistor 120 and the other of the terminals of the resistor 121 are connected is connected to an inverting input terminal (−) of the error amplifier 122. Therefore, the output voltage is divided by the resistor 120 and the resistor 121 and supplied to the inverting input terminal (−) of the error amplifier 122 as a feedback signal FB.

A non-inverting input terminal (+) of the error amplifier 122 is supplied with a reference voltage Vref1. In the error amplifier 122, the voltage of a feedback signal FB applied to the inverting input terminal (−) and the reference voltage Vref1 are compared and a signal ER-OUT including voltage obtained by amplification of the difference thereof is output from an output terminal of the error amplifier 122.

The voltage of the signal ER-OUT output from the error amplifier 122 is applied to a non-inverting input terminal (+) of the comparator 123. A triangle wave signal or a sawtooth signal which is output from the triangle wave generator 124 is applied to the inversion input terminal (−) of the comparator 123. Thus, the comparator 123 generates a control signal with a rectangle wave which has a constant frequency and which has a pulse width varying in accordance with the voltage applied to the non-inverting input terminal (+). The control signal output from the comparator 123 is applied to the selection circuit 106.

Input voltage from the input terminal IN1 is applied to the selection circuit 106 in addition to the voltage of the control signal. Either the voltage of the control signal or the input voltage is selected by the selection circuit 106 in accordance with the level of the voltage of the feedback signal FB and then is output from the control circuit 103 through the buffer 107. Then, the voltage output from the control circuit 103 is input to the gate electrode of the transistor 101.

Note that the control signal generation circuit 105 may include a phase compensation circuit. In the case of using a phase compensation circuit, the voltage output from the error amplifier 122 is applied to the phase compensation circuit, and the voltage output from the phase compensation circuit is applied to the comparator 123. The phase compensation circuit controls a phase of voltage output from the error amplifier 122. The phase of the voltage is controlled by the phase compensation circuit, so that oscillation of an amplifier, such as the error amplifier 122 or the comparator 123, is prevented and the operation of the DCDC converter can be stabilized.

The level of the voltage of the feedback signal FB is detected in the voltage detection circuit 104a. Specifically, in the DCDC converter shown in FIG. 3, the voltage of the signal ER-OUT output from the error amplifier 122 is detected in the voltage detection circuit 104a, so that the voltage of the feedback signal FB is indirectly detected.

Figure 4:
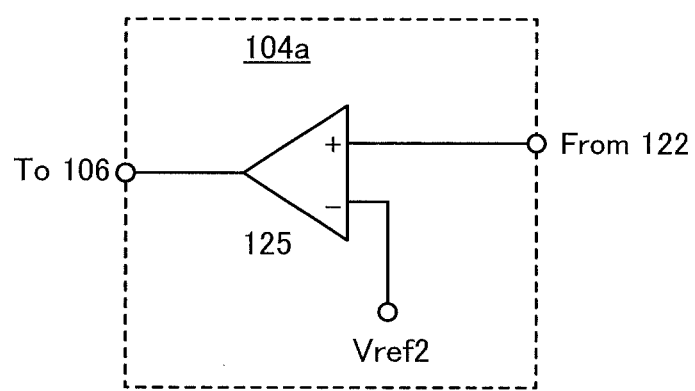
FIG. 4 is a diagram showing a structure of a voltage detection circuit.

FIG. 4 shows an example of a specific structure of the voltage detection circuit 104a. The voltage detection circuit 104a shown in FIG. 4 includes a comparator 125. The voltage of the signal ER-OUT output from the error amplifier 122 is applied to a non-inverting input terminal (+) of the comparator 125. A reference voltage Vref2 is applied to an inverting input terminal (−) of the comparator 125.

Note that the value of the reference voltage Vref2 is different from the value of the reference voltage Vref1. In addition the value of the reference voltage Vref2 is set in accordance with the threshold value of output voltage.

The comparator 125 compares the voltage of the signal ER-OUT and the reference voltage Vref2 that are input. When the voltage of the signal ER-OUT is the same as or higher than the reference voltage Vref2, the comparator 125 outputs high-level voltage. When the voltage of the signal ER-OUT is lower than the reference voltage Vref2, the comparator 125 outputs low-level voltage.

Then, when the high-level voltage is applied from the voltage detection circuit 104a, the selection circuit 106 determines that the output voltage of the DCDC converter is the same as or higher than the threshold value and outputs the voltage of the control circuit. When the voltage of the control circuit is applied to the gate electrode of the transistor 101, the transistor 101 performs switching by repeating ON and OFF.

In addition, when the low-level voltage is applied from the voltage detection circuit 104a, the selection circuit 106 determines that the output voltage of the DCDC converter is lower than the threshold value, outputs the input voltage, and stops driving of the triangle wave generator 124. When the input voltage is applied to the gate electrode of the transistor 101, the transistor 101 is held in ON state. Therefore, the input voltage applied to the input terminal IN1 is applied to the output terminal OUT1 as output voltage through the transistor 101 and the coil 111. In one embodiment of the present invention, when the output voltage of the DCDC converter falls below the threshold voltage, the transistor 101 is held in ON state; thus, power consumed in switching the transistor 101 can be reduced and the power consumption in the transistor 101 can be reduced.

Note that in a step-down DCDC converter, difference between the input voltage and the output voltage is small when the input power is low. Therefore, even when the transistor 101 is held in ON state and the input voltage is output as output voltage without being stepped down and with no change, it would be little problem for operation of a semiconductor device and a power generation device using a DCDC converter.

In addition, when input voltage is applied to the gate electrode of the transistor 101, the input voltage is also applied to the first terminal of the transistor 101; thus, the transistor 101 serves as a diode. Therefore, even when a backflow prevention diode is not additionally provided, current can be prevented from flowing backward from the output side to the input side of the DCDC converter when the input voltage falls below the output voltage in the DCDC converter.

In addition, the selection circuit 106 stops driving of the triangle wave generator 124 when output voltage of the DCDC converter falls below the threshold value. Specifically, generation of a triangle wave signal or a sawtooth signal in the triangle wave generator 124 is stopped. As a result, power consumed in the triangle wave generator 124 can be reduced and thus power consumption in the control circuit 103 can be reduced.

Therefore, in one embodiment of the present invention, a reduction in power conversion efficiency can be suppressed even when input power is small. Further, in one embodiment of the present invention, reduction in power consumption of a semiconductor device can be achieved with the use of the DCDC converter. Further, in one embodiment of the present invention, improvement of the power conversion efficiency of a power generation device can be achieved with the use of the DCDC converter.

Figure 7:
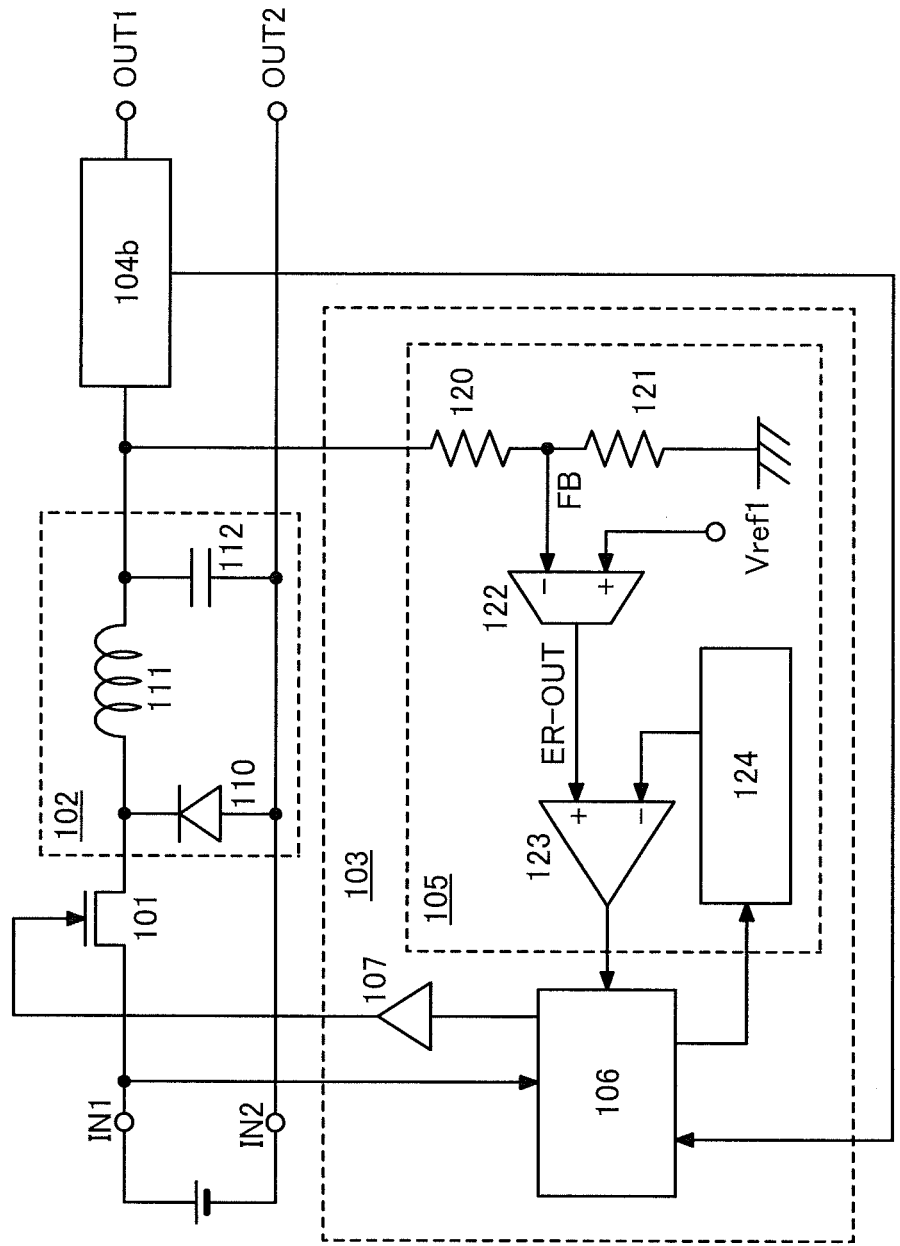
FIG. 7 is a diagram showing a structure of a DCDC converter.

Next, FIG. 7 shows an example of a specific structure of the DCDC converter 100 in the case of using a current detection circuit detecting output current as the detection circuit 104. The DCDC converter shown in FIG. 7 is different from the DCDC converter shown in FIG. 3 only in that a current detection circuit 104b is used as a detection circuit. Thus, description on FIG. 3 can be referred to for the structures and operations of the transistor 101, the voltage conversion portion 102, and the control circuit 103. Hereinafter, only the difference between the DCDC converter shown in FIG. 3 and the DCDC converter shown in FIG. 7 will be described.

First, in the case of the DCDC converter in FIG. 7, the selection circuit 106 selects either the voltage of the control signal or the input voltage in accordance with the amount of output current from the voltage conversion portion 102, and the selected voltage is output from the control circuit 103 though the buffer 107. The amount of the output current is detected by the current detection circuit 104b. Specifically, in the DCDC converter shown in FIG. 7, the output current flowing between the output terminal of the voltage conversion portion 102 and the output terminal OUT1 of the DCDC converter is detected in the current detection circuit 104b.

Figure 8:
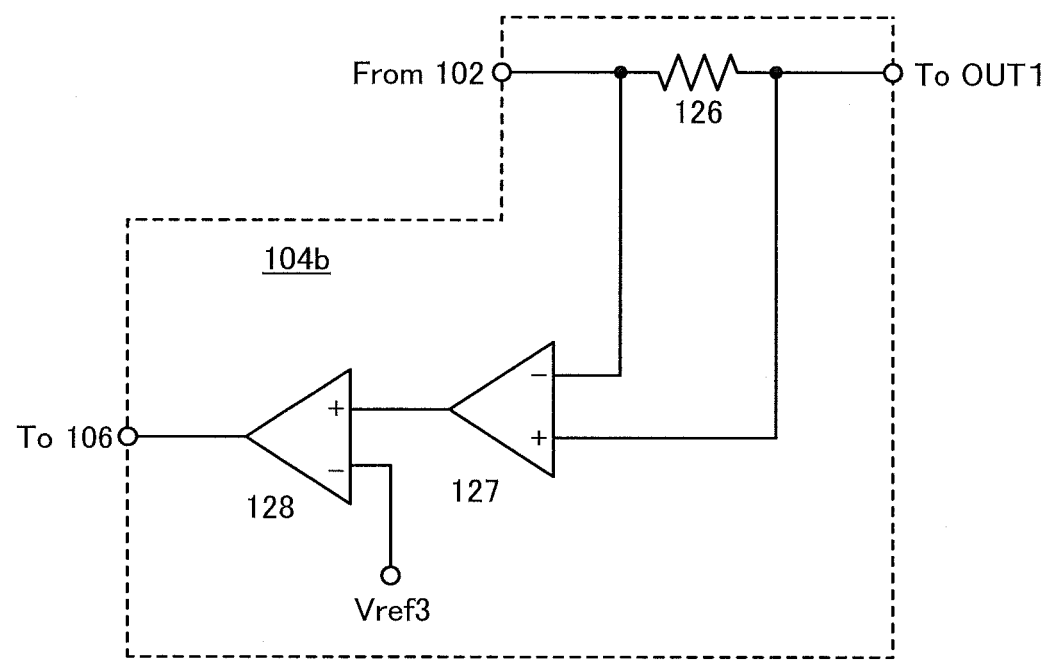
FIG. 8 is a diagram showing a structure of a current detection circuit.

FIG. 8 shows an example of a specific structure of the current detection circuit 104b. The current detection circuit 104b shown in FIG. 8 includes a shunt resistor 126, a differential amplifier 127, and a comparator 128. The shunt resistor 126 is connected in series to the output terminal of the voltage conversion portion 102 and the output terminal OUT1 and is provided therebetween. One terminal of the shunt resistor 126 that is connected to the output terminal of the voltage conversion portion 102 is connected to an inverting input terminal (−) of the differential amplifier 127. The other terminal of the shunt resistor 126 that is connected to the output terminal OUT1 is connected to a non-inverting input terminal (+) of the differential amplifier 127.

The differential amplifier 127 amplifies a difference of voltage between voltage input to the inverting input terminal (−) and the non-inverting input terminal (+) and outputs the amplified difference from the output terminal. The difference of the voltage reflects the amount of the output current. As the difference of the voltage is larger, the amount of the output current is larger. As the difference of the voltage is smaller, the amount of the output current is smaller.

The comparator 128 compares the voltage input from the differential amplifier 127 and a reference voltage Vref3. When the voltage from the differential amplifier 127 is the same as or larger than the reference voltage Vref3, the comparator 128 outputs high-level voltage. When the voltage from the differential amplifier 127 is smaller than the reference voltage Vref3, the comparator 128 outputs low-level voltage. The high-level voltage or the low-level voltage output from the comparator 128 is applied to the selection circuit 106. The selection circuit 106 determines whether the output current of the DCDC converter falls below the threshold value or not in accordance with the applied voltage, and operation similar to the operation of the DCDC converter in FIG. 3 as describe above is performed.

Note that the value of the reference voltage Vref3 may be the same as or different from the value of the reference voltage Vref1 or the value of the reference voltage Vref2. In addition the value of the reference voltage Vref3 is set in accordance with the threshold value of output current.

Note that FIG. 3 and FIG. 7 each show an example of a structure of the control signal generation circuit 105 in the case of generating a control signal for pulse width modulation control (PWM). However, in the DCDC converter according to one embodiment of the present invention, the switching of the transistor 101 may be controlled with the use of a control signal for pulse frequency modulation control (PFM).

Figure 5A:
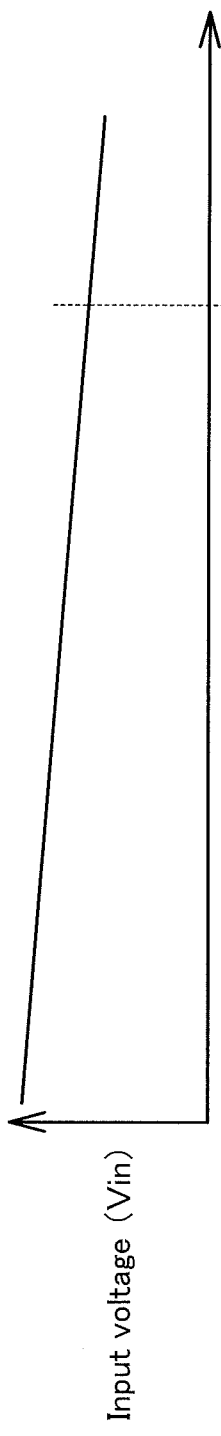
FIGS. 5A to 5C are diagrams each showing change over time in input voltage Vin, change over time in voltage Vgs, and change over time in output voltage Vout.
Figure 5B:
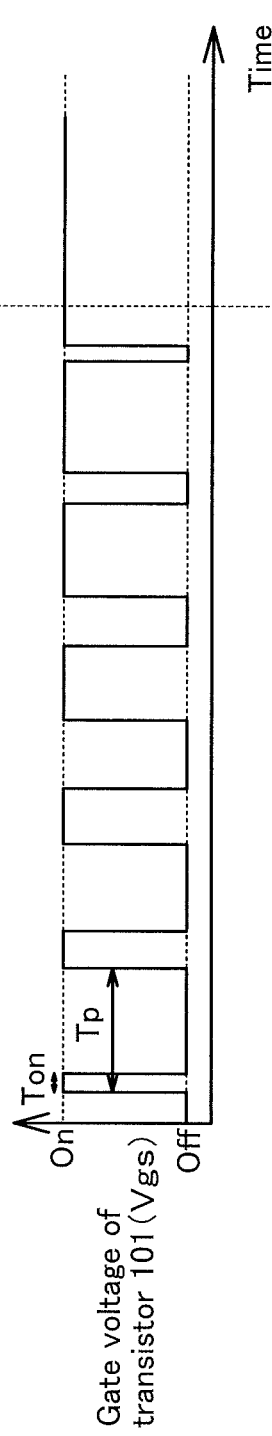
Figure 5C:
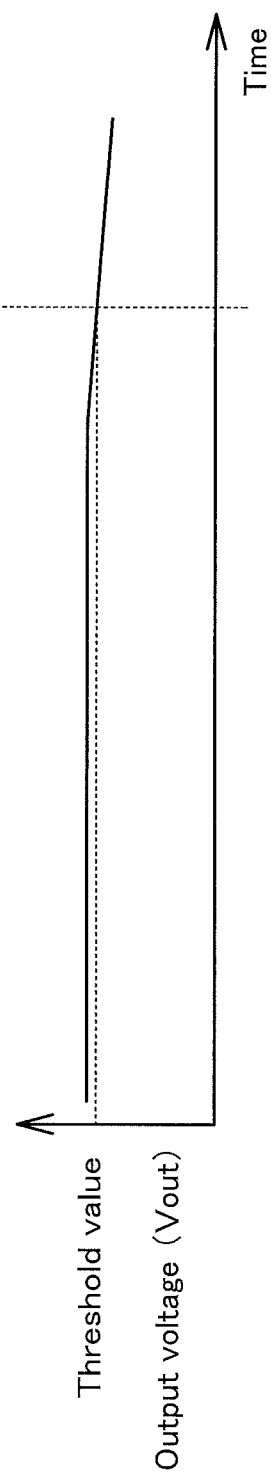

FIG. 5A shows an example of change over time in input voltage Vin of the DCDC converter. FIG. 5B shows an example of change over time in the gate voltage Vgs of the transistor 101 in the case of using pulse width control. FIG. 5C shows an example of change over time in output voltage Vout of the DCDC converter in the case where the gate voltage Vgs of the transistor 101 is changed over time as shown in FIG. 5B when the input voltage shown in FIG. 5A is applied to the DCDC converter.

As shown in FIG. 5A, the input voltage Vin gets lower over time. Therefore, in order to obtain constant output voltage Vout, range of voltage reduction in the DCDC converter needs to be smaller over time. For that reason, as shown in FIG. 5B, the gate voltage Vgs of the transistor 101 shows a pulse voltage waveform and the pulse width Ton thereof gets wider over time. Note that in the case of the pulse width control, the time interval Tp between timings at which pulses are generated is kept constant and the pulse width Ton is variable.

In the case of the input voltage Vin shown in FIG. 5A, the transistor 101 is switched in accordance with the gate voltage Vgs shown in FIG. 5B, so that the output voltage Vout shown in FIG. 5C can be obtained. As shown in FIG. 5B, in the step-down DCDC converter according to one embodiment of the present invention, when the pulse width Ton is small, the input voltage is sharply stepped down, and when the pulse width Ton is wide, the input voltage is gradually stepped down.

Note that as the input voltage gets smaller, the output voltage Vout starts stepping down even when the pulse width Ton is largest at a maximum. In one embodiment of the present invention, when the output voltage Vout falls below the threshold value, the switching of the transistor 101 is stopped and the transistor 101 is held in ON state. With the above structure, power loss inside the DCDC converter can be reduced, so that the step-down of the output voltage Vout can be suppressed.

Figure 6A:
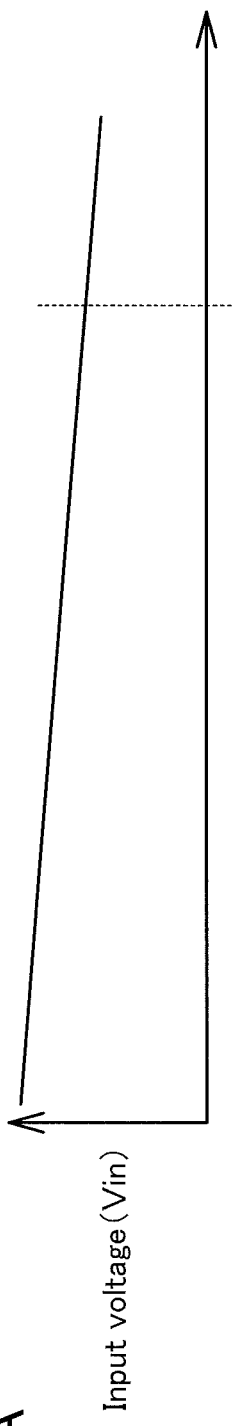
FIGS. 6A to 6C are diagrams each showing change over time in input voltage Vin, change over time in voltage Vgs, and change over time in output voltage Vout.
Figure 6B:
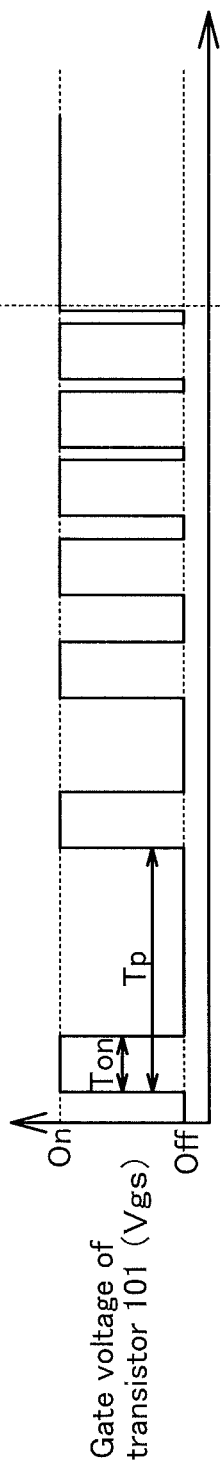
Figure 6C:
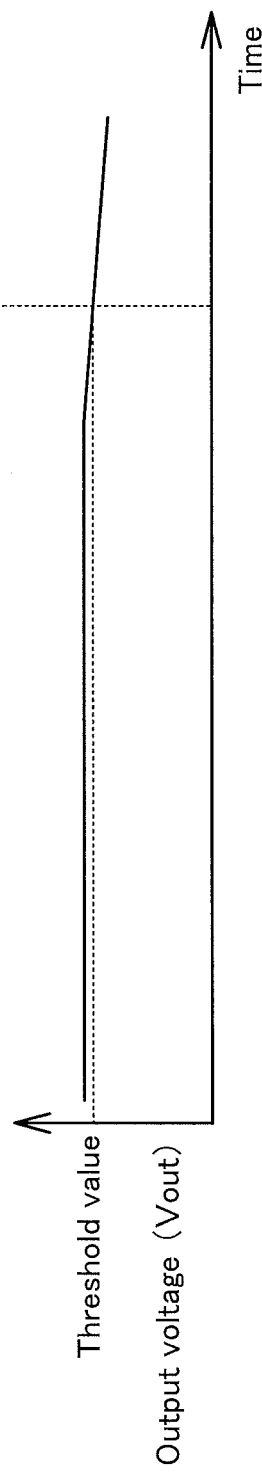

Next, FIG. 6A shows an example of change over time in input voltage Vin of the DCDC converter. FIG. 6B shows an example of a change over time of the gate voltage Vgs of the transistor 101 in the case of employing the pulse frequency control. FIG. 6C shows an example of change over time in output voltage Vout of the DCDC converter in the case where the gate voltage Vgs of the transistor 101 is changed over time as shown in FIG. 6B when the input voltage shown in FIG. 6A is applied to the DCDC converter.

As shown in FIG. 6A, the input voltage Vin gets lower over time. Therefore, in order to obtain constant output voltage Vout, range of voltage reduction in the DCDC converter needs to be smaller over time. For that reason, as shown in FIG. 6B, the gate voltage Vgs of the transistor 101 shows a pulse voltage waveform and the time interval Tp between timings at which pulses are generated gets smaller over time. In the case of the pulse frequency control, the pulse width Ton is kept constant and the time interval Tp between timings at which pulses are generated is variable.

In the case of the input voltage Vin shown in FIG. 6A, the transistor 101 is switched in accordance with the gate voltage Vgs shown in FIG. 6B, so that the output voltage Vout shown in FIG. 6C can be obtained. As shown in FIG. 6B, in the step-down DCDC converter according to one embodiment of the present invention, when the time interval Tp is large, the input voltage is sharply stepped down, and when the time interval Tp is small, the input voltage is gradually stepped down.

Note that as the input voltage gets smaller, the output voltage Vout starts stepping down even when the time interval Tp is smallest at a maximum. In one embodiment of the present invention, when the output voltage Vout falls below the threshold value, the switching of the transistor 101 is stopped and the transistor 101 is held in ON state. With the above structure, power loss inside the DCDC converter can be reduced, so that the step-down of the output voltage Vout can be suppressed.

Note that in one embodiment of the present invention, the output voltage may be adjusted by a combination of the pulse width control and the pulse frequency control which are utilized for switching of the transistor 101. In the case of low output power, the frequency of switching of the transistor 101 can be suppressed to be low by the pulse frequency control rather than by the pulse width control; accordingly, power loss due to switching of the transistor 101 is suppressed to be low. In contrast, in the case of high output power, the frequency of switching of the transistor 101 can be suppressed to be low by the pulse width control rather than by the pulse frequency control; accordingly, power loss due to the switching of the transistor 101 is suppressed to be low. Therefore, the pulse width control and the pulse frequency control may be switched depending on the amount of the output power, whereby power conversion efficiency can be enhanced.

Note that although in FIG. 1, FIG. 3, and FIG. 7, only one transistor 101 serving as a switching element is included, the present invention is not limited to this structure. In this embodiment of the present invention, a plurality of transistors may function as one switching element. In the case where the plurality of transistors serving as one switching element is provided, the plurality of transistors may be connected to each other in parallel, in series, or in combination of a parallel connection and a series connection.

Note that in this specification, the state in which the transistors are connected to each other in series means, for example, the state in which only one of a first terminal and a second terminal of a first transistor is connected to only one of a first terminal and a second terminal of a second transistor. Further, the state in which the transistors are connected to each other in parallel means a state in which the first terminal of the first transistor is connected to the first terminal of the second transistor and the second terminal of the first transistor is connected to the second terminal of the second transistor.

Embodiment 2

Figure 9:
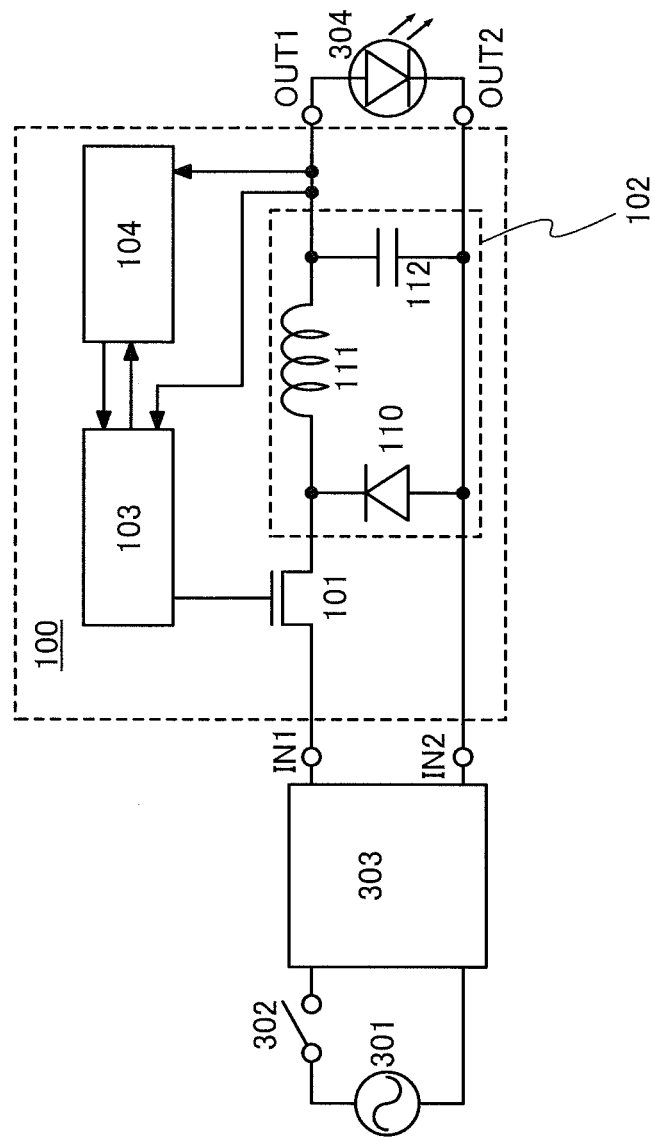
FIG. 9 is a diagram showing a structure of a lighting device.

In this embodiment, an example of a lighting device which is one of semiconductor devices according to one embodiment of the present invention will be described. FIG. 9 illustrates an example of a structure of a lighting device.

The lighting device in FIG. 9 includes an AC power source 301, a switch 302, a rectification circuit 303, the DCDC converter 100, and a light-emitting element 304. The rectification circuit 303 and the DCDC converter 100 form a power supply circuit.

The DCDC converter 100 in FIG. 9 has the same structure as that of the DCDC converter 100 in FIG. 3 or FIG. 7. Specifically, in the lighting device in FIG. 9, AC voltage from the AC power source 301 is supplied to the rectification circuit 303 through the switch 302 and rectified. DC voltage obtained by the rectification is input to the DCDC converter 100 and is output after the level is adjusted. Description in Embodiment 1 can be referred to for specific operation of the DCDC converter 100.

The voltage output from the DCDC converter 100 is supplied to the light-emitting element 304, so that the light-emitting element 304 emits light. As the light-emitting element 304, various light sources such as a light-emitting diode (LED) and an organic light-emitting element (OLED) can be used.

In the DCDC converter 100 according to one embodiment of the present invention, power loss inside the DCDC converter can be reduced even when input power is small; thus, a reduction in power conversion efficiency can be suppressed. Therefore, with the use of the DCDC converter 100 for a lighting device, a reduction in power consumption of the lighting device can be achieved.

Although in FIG. 9, a lighting device in which the AC power source 301 is used as a power source is illustrated, the present invention is not limited thereto. As the power source, a DC power source may be used instead of an AC power source. Note that in the case of using a DC power source, the rectification circuit 303 is not necessarily provided.

In addition, although a structure of a lighting device in which the AC power source 301 is used as a power source is illustrated in FIG. 9, a lighting device according to one embodiment of the present invention does not necessarily include a power source as its component.

This embodiment can be implemented by being combined as appropriate with any of the above-described embodiments.

Embodiment 3

Figure 10:
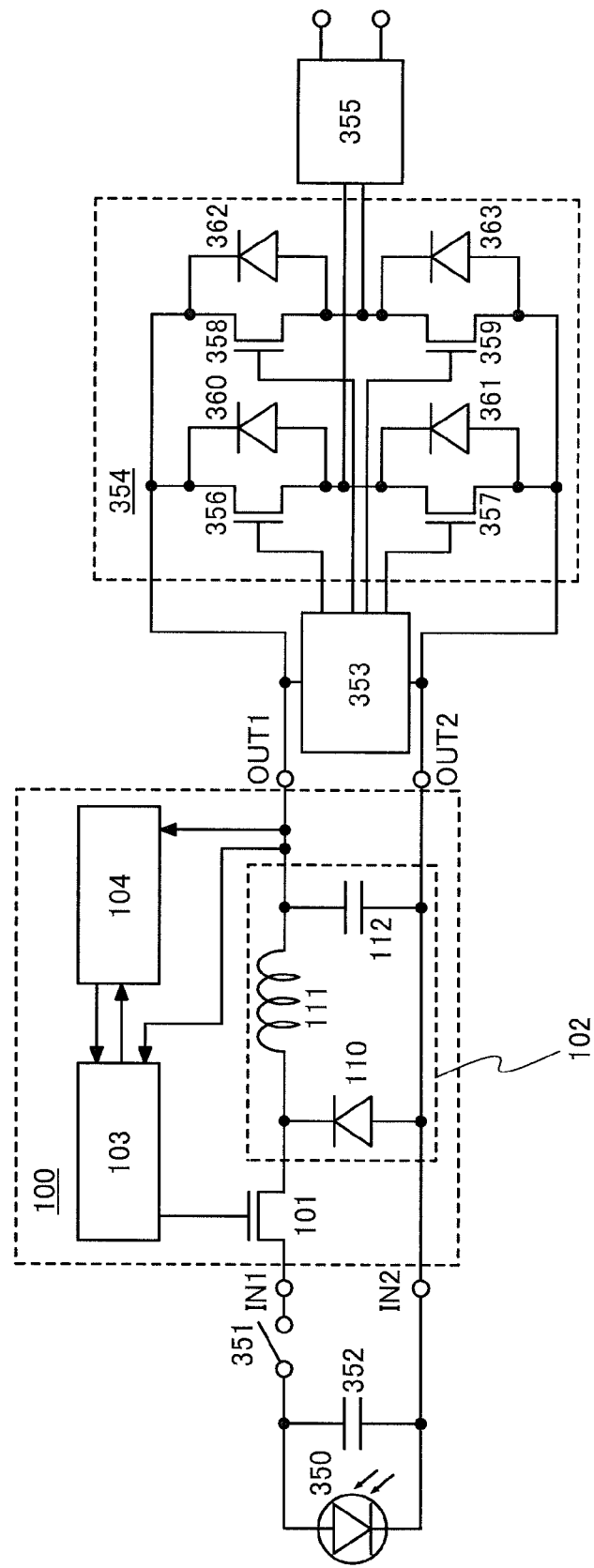
FIG. 10 is a diagram showing a structure of a solar power generation device.

In this embodiment, one embodiment of a solar power generation device which is one of power generation devices according to one embodiment of the present invention will be described. FIG. 10 shows an example of a structure of a solar power generation device.

The solar cell in FIG. 10 includes a photodiode 350 serving as a solar battery, a switch 351, a capacitor 352, the DCDC converter 100, a pulse width modulation circuit 353, an inverter 354, and a band pass filter 355.

The DCDC converter 100 in FIG. 10 has the same structure as that of the DCDC converter in FIG. 3 or FIG. 7. Specifically, in the solar power generation device in FIG. 10, voltage is generated when light is delivered to the photodiode 350. The voltage smoothed by the capacitor 352 is input to the DCDC converter 100 through the switch 351. Note that with the capacitor 352, the pulsed current generated by switching of the switch 351 can be prevented from flowing through the photodiode 350.

Then, the voltage input to the DCDC converter 100 is output after the voltage is adjusted by the DCDC converter 100. Description in Embodiment 1 can be referred to for specific operation of the DCDC converter 100. In this embodiment, the inputted voltage is stepped down by the DCDC converter 100 and is output.

The voltage output from the output terminal OUT1 of the DCDC converter 100 is DC voltage. The inverter 354 converts the DC voltage output from the DCDC converter 100 to AC voltage and then outputs the AC voltage. FIG. 10 shows an example of a structure in which the inverter 354 includes four transistors 356 to 359 and four diodes 360 to 363.

Specifically, a first terminal of the transistor 356 is connected to the output terminal OUT1 of the DCDC converter 100 and a second terminal of the transistor 356 is connected to a first terminal of the transistor 357. A second terminal of the transistor 357 is connected to the output terminal OUT2 of the DCDC converter 100. A first terminal of the transistor 358 is connected to the output terminal OUT1 of the DCDC converter 100 and a second terminal of the transistor 358 is connected to a first terminal of the transistor 359. A second terminal of the transistor 359 is connected to the output terminal OUT2 of the DCDC converter 100. The diodes 360, 361, 362, and 363 are connected to the transistors 356, 357, 358, and 359 in parallel respectively. Specifically, the first terminals of the transistors 356, 357, 358, and 359 are connected to cathodes of the diodes 360, 361, 362, and 363, respectively. The second terminals of the transistors 356, 357, 358, and 359 are connected to anodes of the diodes 360, 361, 362, and 363.

To the pulse width modulation circuit 353, the voltage output from the DCDC converter 100 is supplied. The pulse width modulation circuit 353 is operated by application of the voltage and generates a signal for controlling switching of the transistors 356 to 359.

The transistors 356 to 359 perform switching in accordance with the signal from the pulse width modulation circuit 353, whereby AC voltage with a PWM waveform is output from a node in which the second terminal of the transistor 356 and the first terminal of the transistor 357 in the inverter 354 are connected and a node in which the second terminal of the transistor 358 and the first terminal of the transistor 359 in the inverter 354 are connected.

Then, a high-frequency component is removed from the AC voltage output from the inverter 354 by using the band pass filter 355, whereby AC voltage with a sine wave can be obtained.

Note that in the power generation device shown in FIG. 10, the case where the AC voltage output from the power generation device is supplied to a load connected to the subsequent stage of the power generation device is assumed. However, in the case where a power storage portion of a secondary battery, a capacitor, or the like is charged with the use of the voltage output from the power generation device, the voltage output from the power generation device is DC voltage. Thus, in this case, the pulse width modulation circuit 353 and the inverter 354 for obtaining AC voltage are not necessarily provided, and the output voltage from the DCDC converter 100 is utilized as the output voltage from the power generation device.

In the case of a power generation device which is powered utilizing natural energy, such as solar power generation or wind power generation, the amount of obtained electric power often depends on natural conditions. For example, in the case where input power from the power generation portion is small, power conversion efficiency of the DCDC converter gets low, so that output voltage tends to be further smaller. When output power from the DCDC converter gets too small, the amount of power supplied from a DCDC converter to a secondary battery or a load is also small. As a result, a problem such that charge in a power storage portion is not performed or operation in a load is not normally performed is often caused. However, in the power generation device according to one embodiment of the present invention, a reduction in power conversion efficiency can be suppressed even when input power to the DCDC converter is small. Accordingly, in the case where input power from the power generation portion is small, a reduction of output power from the DCDC converter can be suppressed, so that the range of the input power with which charging of the secondary battery and operation of the load are ensured can be wider.

This embodiment can be implemented by being combined as appropriate with any of the above embodiments.

EXAMPLE 1

With the DCDC converter and the semiconductor device according to one embodiment of the present invention, an electronic device with low power consumption can be provided. In particular, in the case where a portable electronic device which has difficulty in continuously receiving power, an advantage in increasing the continuous operating time can be longer when a semiconductor device with low power consumption according to one embodiment of the present invention is added as a component of the device. Further, with the power generation device according to one embodiment of the present invention, an electronic device can be provided in which the reliability of charge in a power storage portion, operation of a load, and the like is high even when there is a change in the amount of power generated in the power generation portion.

The semiconductor device according to one embodiment of the present invention can be used for display devices, laptops, or image reproducing devices provided with recording media (typically, devices which reproduce the content of recording media such as digital versatile discs (DVDs) and have displays for displaying the reproduced images). Other than the above, as electronic devices which can utilize the semiconductor device according to one embodiment of the present invention, mobile phones, portable game machines, portable information terminals, e-book readers, video cameras, digital still cameras, goggle-type displays (head mounted displays), navigation systems, audio reproducing devices (e.g., car audio systems and digital audio players), copiers, facsimiles, printers, multifunction printers, automated teller machines (ATM), vending machines, and the like can be given. Specific examples of such electronic appliances are shown in FIGS. 11A to 11D.

Figure 11A:
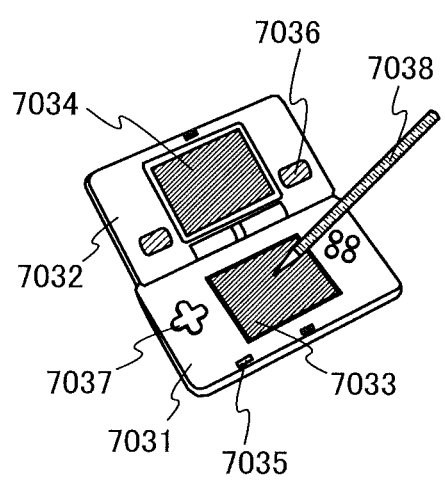
FIGS. 11A to 11D are diagrams showing electronic devices.

FIG. 11A is a portable game machine including a housing 7031, a housing 7032, a display portion 7033, a display portion 7034, a microphone 7035, speakers 7036, operation keys 7037, a stylus 7038, and the like. The DCDC converter and the semiconductor device according to one embodiment of the present invention can be used for an integrated circuit for controlling the driving of the portable game machine. With the use of the DCDC converter and the semiconductor device according to one embodiment of the present invention for the integrated circuit for controlling driving of the portable game machine, a portable game machine with low power consumption can be provided. In addition, with the use of the power generation device according to one embodiment of the present invention for a portable game machine, continuous operating time of the portable game machine can be longer, so that the reliability can be improved. Although the portable game machine shown in FIG. 11A includes two display portions, the display portion 7033 and the display portion 7034, the number of display portions included in the portable game machine is not limited to two.

Figure 11B:
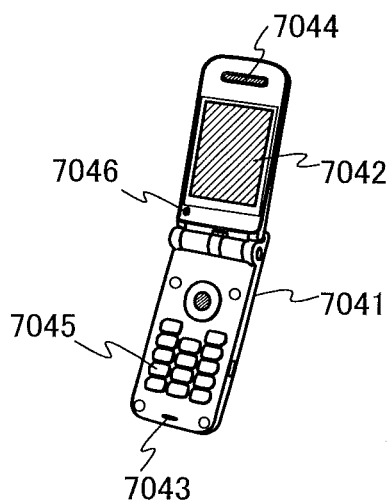

FIG. 11B is a mobile phone including a housing 7041, a display portion 7042, an audio input portion 7043, an audio output portion 7044, operation keys 7045, a light-receiving portion 7046, and the like. Light received in the light-receiving portion 7046 is converted into electrical signals, whereby external images can be loaded. The DCDC converter and the semiconductor device according to one embodiment of the present invention can be used for an integrated circuit for controlling driving of the mobile phone. With the use of the DCDC converter and the semiconductor device according to one embodiment of the present invention for the integrated circuit for controlling driving of the mobile phone, a mobile phone with low power consumption can be provided. In addition, with the use of the power generation device according to one embodiment of the present invention for a mobile phone, continuous operating time of the mobile phone can be longer, so that the reliability can be improved.

Figure 11C:
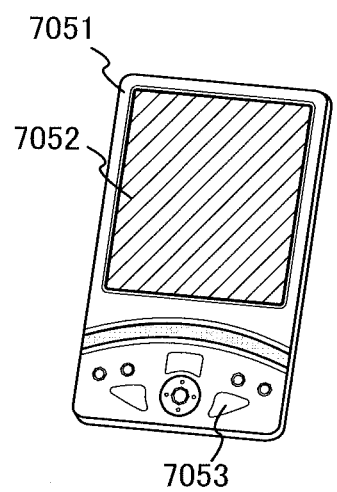

FIG. 11C is a portable information terminal including a housing 7051, a display portion 7052, operation keys 7053, and the like. A modem may be incorporated in the housing 7051 of the portable information terminal shown in FIG. 11C. The DCDC converter and the semiconductor device according to one embodiment of the present invention can be used for an integrated circuit for controlling driving of the portable information terminal. With the use of the DCDC converter and the semiconductor device according to one embodiment of the present invention for the integrated circuit for controlling driving of the potable information terminal, a portable information terminal with low power consumption can be provided. In addition, with the use of the power generation device according to one embodiment of the present invention for a portable information terminal, continuous operating time of the portable information terminal can be longer, so that the reliability can be improved.

Figure 11D:
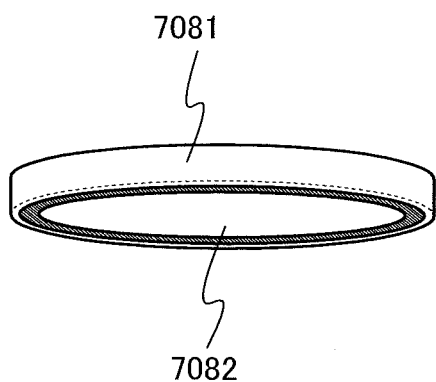

FIG. 11D is a lighting device including a housing 7081, a light source 7082, and the like. The light source 7082 includes a light-emitting element. The DCDC converter and the semiconductor device according to one embodiment of the present invention can be used for an integrated circuit for controlling the driving of the lighting device. With the use of the DCDC converter and the semiconductor device according to one embodiment of the present invention for the integrated circuit for controlling driving of the lighting device, a lighting device with low power consumption can be provided. In addition, with the use of the power generation device according to one embodiment of the present invention for a lighting device, continuous operating time of the lighting device can be longer, so that the reliability can be improved.

This example can be implemented by being combined as appropriate with any of the above embodiments.

This application is based on Japanese Patent Application serial no. 2010-227313 filed with Japan Patent Office on Oct. 7, 2010, the entire contents of which are hereby incorporated by reference.

What is claimed is:

1. A DCDC converter comprising:
   a control circuit;
   a transistor in which switching is controlled by supply of voltage output from the control circuit to a gate of the transistor;
   a voltage conversion portion in which supply of input voltage is controlled by the switching of the transistor and output power commensurate with a duty ratio of the switching of the transistor is generated; and
   a detection circuit configured to detect the output power, wherein the control circuit comprises:
      a control signal generation circuit configured to generate a control signal with a pulse voltage waveform; and
      a selection circuit configured to apply voltage of the control signal to the gate of the transistor in the case where the output power detected by the detection circuit is the same as or exceeds a threshold value and apply the input voltage to the gate of the transistor in the case where the output power detected by the detection circuit falls below the threshold value.

2. A semiconductor device, wherein the DCDC converter described in claim 1 is used.

3. A power generation device comprising:
   the DCDC converter described in claim 1;
   a power generation portion configured to supply generated power to the DCDC converter as input voltage; and
   a power storage portion in which charging is performed utilizing output voltage from the DCDC converter.

4. The power generation device according to claim 3, wherein a photo diode is used for the power generation portion.

5. A DCDC converter according to claim 1, wherein the output power detected by the detection circuit is voltage of the output power.

6. A DCDC converter according to claim 1, wherein the output power detected by the detection circuit is a current of the output power.

7. A DCDC converter comprising:
   a control circuit;
   a transistor in which switching is controlled by supply of voltage output from the control circuit to a gate of the transistor;
   a voltage conversion portion in which supply of input voltage is controlled by the switching of the transistor and output power commensurate with a duty ratio of the switching of the transistor is generated; and
   a detection circuit,
   wherein the control circuit comprises a control signal generation circuit and a selection circuit,
   wherein the control signal generation circuit comprises:

a plurality of resistors configured to generate a feedback signal by dividing a voltage of the output power;
a differential amplifier in which voltage of the feedback signal is applied to an inverting input terminal and a reference voltage is applied to a non-inverting input terminal;
a triangle wave generator configured to generate a triangle wave or a sawtooth wave; and
a comparator configured to generate a control signal with a pulse voltage waveform by application of voltage output from the differential amplifier to the non-inverting input terminal and by application of an output signal output from the triangle wave generator to the inverting input terminal,
wherein the detection circuit is configured to detects voltage output from the differential amplifier, and
wherein the detection circuit comprises the selection circuit configured to apply voltage of the control circuit to the gate of the transistor in the case where voltage output from the differential amplifier detected by the detection circuit is the same as or exceeds a threshold value and apply the input voltage to the gate of the transistor in the case where voltage output from the differential amplifier detected by the detection circuit falls below the threshold value.

8. A semiconductor device, wherein the DCDC converter described in claim 7 is used.

9. A power generation device comprising:
the DCDC converter described in claim 7;
a power generation portion configured to supply generated power to the DCDC converter as input voltage; and
a power storage portion in which charging is performed utilizing output voltage from the DCDC converter.

10. The power generation device according to claim 9, wherein a photo diode is used for the power generation portion.

* * * * *